United States Patent [19]
Fish

[11] Patent Number: 5,206,577
[45] Date of Patent: Apr. 27, 1993

[54] BATTERY CHARGER

[76] Inventor: Robert D. Fish, 255 S. Grand Ave. #911, Los Angeles, Calif. 90012

[21] Appl. No.: 767,404
[22] Filed: Sep. 30, 1991
[51] Int. Cl.$^5$ .......................................... H01M 10/44
[52] U.S. Cl. ......................................... 320/2; 320/14; 320/5
[58] Field of Search ............................ 320/2, 14, 5, 16

[56] References Cited
U.S. PATENT DOCUMENTS

| | | | |
|---|---|---|---|
| 3,696,283 | 10/1972 | Ackley, III | 320/2 |
| 4,140,958 | 2/1979 | Groeschel | 320/14 |
| 4,237,409 | 12/1980 | Sugalski | 320/2 |
| 4,422,031 | 12/1983 | Vigerstol | 320/2 |
| 4,698,579 | 10/1987 | Richter et al. | 320/14 |

Primary Examiner—Steven L. Stephan
Assistant Examiner—Matthew Nguyen

[57] ABSTRACT

A device and method for storing and charging rechargeable batteries which are stacked within a charger housing, preferably with batteries being added to the top of the stack and removed from the bottom of the stack. Batteries advance from the top of the stack to the bottom of the stack under the force of gravity. Batteries towards the top of the stack are discharged through resistances, and those towards the bottom of the stack are parallely charged. Switches control which batteries are charged and which are discharged.

10 Claims, 2 Drawing Sheets

BATTERY CHARGER

BACKGROUND OF THE INVENTION

1. Field of the Invention

The present invention relates to the field of batteries, and more specifically to a method and device for charging and dispensing rechargeable batteries.

2. Description of the Prior Art

Rechargeable batteries, generally of the Nickel-Cadmium variety, (Ni-Cad batteries), are utilized with great frequency in both household and business environments. Typically, the batteries are used to power various electrical loads such as flashlights, toys, and tape recorders. A user of rechargeable batteries often has many more rechargeable batteries than can be utilized at any one time. This permits the user to discharge some of his batteries through use, while concurrently charging the remaining batteries.

There are at numerous problems encountered in the recharging of such batteries. First, many commercially available charging devices can only charge two or four batteries at any given time. In an office having numerous dictation machines, or in a home environment having numerous electrical toys, it is often useful to have the ability to charge six, ten, or a greater number of batteries at any given time.

Second, rechargeable batteries tend to be placed in various out-of-the-way storage spots when they are neither being charged nor being used. This practice leads to batteries eventually becoming misplaced.

Third, rechargeable batteries tend to spontaneously lose their charge over an extended period of time, ("power fading"). To maintain full charges on multiple batteries, a user must rotate all his batteries through a charger at regular intervals. The resulting practice of frequent switching of the batteries into and out of the charging device is both cumbersome and annoying.

Fourth, it is often desireable to vary the charging voltage and rate for different batteries. For example, where the charger is of limited power with respect to the number of batteries being charged, those batteries which are to be used next should receive the greatest voltage, while those batteries not likely to be used for some time should receive the least voltage. Many battery chargers do not have the capability to charge different batteries as different rates.

Fifth, rechargeable batteries exhibit "memory," a condition in which the batteries tend to hold only as much charge as was utilized during the previous discharge. Unless the batteries are fully discharged before they are charged, the batteries will hold progressively smaller and smaller charges over time. Many battery chargers do not have any capability for discharging the batteries prior to recharging.

The prior art shows that while attempts were made to resolve each of these problems, no one was ever successful in resolving all the problems in the same device. For example, U.S. Pat. No. 3,297,932 issued to Murphy in 1967 discloses a dispenser-charger in which serially connected batteries are advanced from a first position to a last position within a charger housing. Murphy's invention resolves the first three problems, quantity, storage and fading by charging a relatively large number of batteries within a small space. However, because the batteries are serially connected, Murphy's device cannot discharge the batteries fully before re-charging, and cannot differentially apply a higher voltage to the batteries near the last position while applying a lower voltage to those batteries near the first position. Moreover, if any of the batteries are sufficiently defective to block the flow of electricity, none of the serially connected batteries will be charged at all. U.S. Pat. Nos. 3,665,285, 4,766,361 disclose the parallel charging of batteries according to different voltages appropriate for each battery, but cannot realistically handle a large number of batteries since the batteries are not efficiently stacked, and do not advance from position to position within the charger.

3. Summary of the Invention

Accordingly, it is an object and advantage of the present invention to resolve each of the problems listed above.

In the present invention, a battery charger is configured to contain a plurality of batteries stacked parallel to one another within a housing. Batteries are preferably added to the top of the stack and removed from the bottom of the stack, such that the batteries within the stack advance from one position to another within the housing. The batteries towards the top of the stack are actively discharged by being shorted across resistors, and the batteries towards the bottom of the stack are parallely charged, or maintained at a full charge, by a voltage source coupled to the bottom of the stack. A combination of switches and position within the housing control which batteries are discharged and which batteries are charged.

The quantity, storage and fading problems are readily resolved by the efficient placement of the batteries within a device of the present invention. The batteries are stacked side by side, allowing a large number of batteries to be charged and stored at the same time, within a relatively compact charger. Differential charging of batteries is accomplished by parallely charging the batteries from a voltage source coupled to the bottom of the stack. Finally, the memory problem is resolved because the batteries can be discharged before they are charged.

BRIEF DESCRIPTION OF THE DRAWINGS

The aforementioned and other objects and advantages of the present invention will be appreciated from the following description and accompanying drawings wherein.

DETAILED DESCRIPTION OF THE PREFERRED EMBODIMENT

Figure 1:
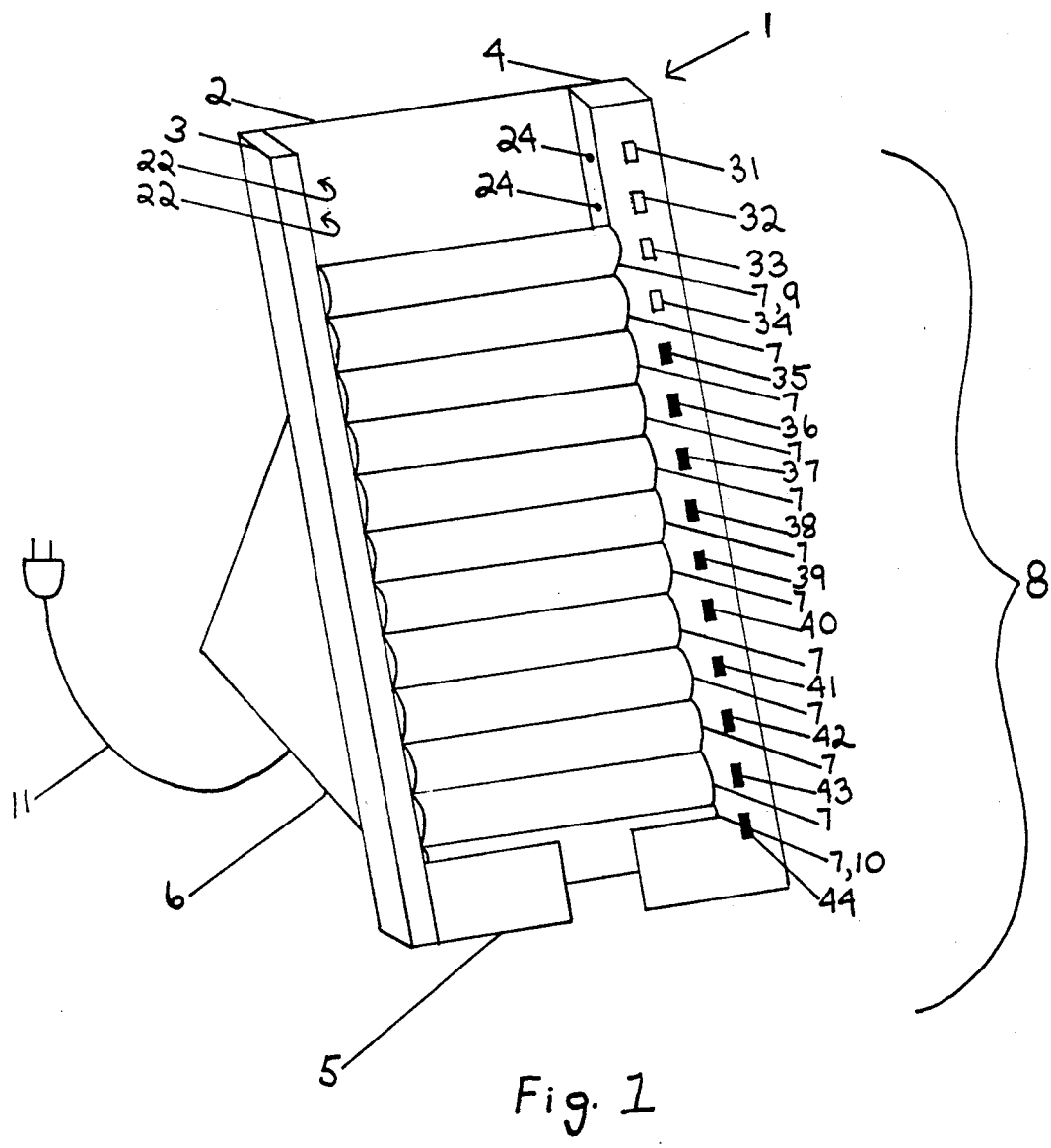
FIG. 1 shows a perspective view of a gravity fed battery charger.

Turning now to FIG. 1, a battery charger housing 1 generally comprises a back 2, a left side 3, a right side 4, a fence 5, and a base 6, which are configured to contain a plurality of batteries 7. The batteries 7 are stacked on top of each other to form a battery stack 8 having a top 9 and a bottom 10. The batteries 7 need not be stacked directly on of each other, and the housing 1 may permit the stack 8 to have a different overall shape than that shown in FIG. 1. In one exemplary variation, the housing 1 may permit the stack 8 to assume a "V" shape or an undulating shape. The housing 1 may also be configured to contain a greater or lesser number of batteries 7, and may be constructed to enclose the batteries 7 to a greater or lesser degree, than that shown in FIG. 1.

These and other variations listed herein are intended to fall within the spirit and scope of the present invention.

In the preferred embodiment, the back 2 is supported at an inclination between vertical and horizontal by the base 6, thereby allowing gravity to advance the batteries 7 from the top 9 of the stack 8 to the bottom 10 of the stack 8. The batteries 7 are preventing from rolling out of the housing 1 by the fence 5. It is desireable, but not absolutely essential for the back 2 to be inclined between vertical and horizontal. If the back 2 is horizontal, the operator can advance the batteries 7 by hand or by a biasing means such as a spring. In such a configuration, the terms top 9 and bottom 10 would then describe the ends of the stack 8 farthest from and closest to the fence 5, respectively. If the back 2 is vertical, a means can be utilized to prevent the batteries 7 from falling out of the housing 1.

It is also not essential for any of the batteries 7 in the stack 8 to physically touch another battery 7. In one exemplary variation, the batteries 7 could rest upon a moving belt instead of the back 2, and the belt could have projections which separate the batteries 7. The batteries 7 could be advanced by turning of the belt.

In the preferred embodiment, batteries 7 are added onto the top 9 of the stack 8, and are removed from bottom 10 of the stack. In this manner, each battery 7 sequentially occupies successive positions within the housing 1, and the stack 8 becomes larger or smaller, depending on whether a net number of batteries 7 is either added to or removed from the stack 8. Since an operator often has different numbers of batteries 7 available for charging at any given time, this ability to handle a variable sized stack 8 of batteries 7 is a major benefit over serial chargers such as that described in the Murphy patent which can only handle a fixed number of batteries 7.

One skilled in the art will appreciate that if there are no batteries 7 in the housing 1, the first battery 7 to be inserted into the housing 1 is placed adjacent to the fence 5. It will also be appreciated that it is possible to insert a battery 7 into the stack 8 at a point other than at the top 9 of the stack 8, or to remove a battery 7 from some point other than the bottom 10 of the stack 8, but such a variation may result in inefficient charging of the batteries 7.

Electric power is brought to the housing 1 via an electric power cord 11. The electric power is used to supply a voltage source 20, (shown only in FIG. 2), which in turn is used to charge the batteries 7.

Figure 2:
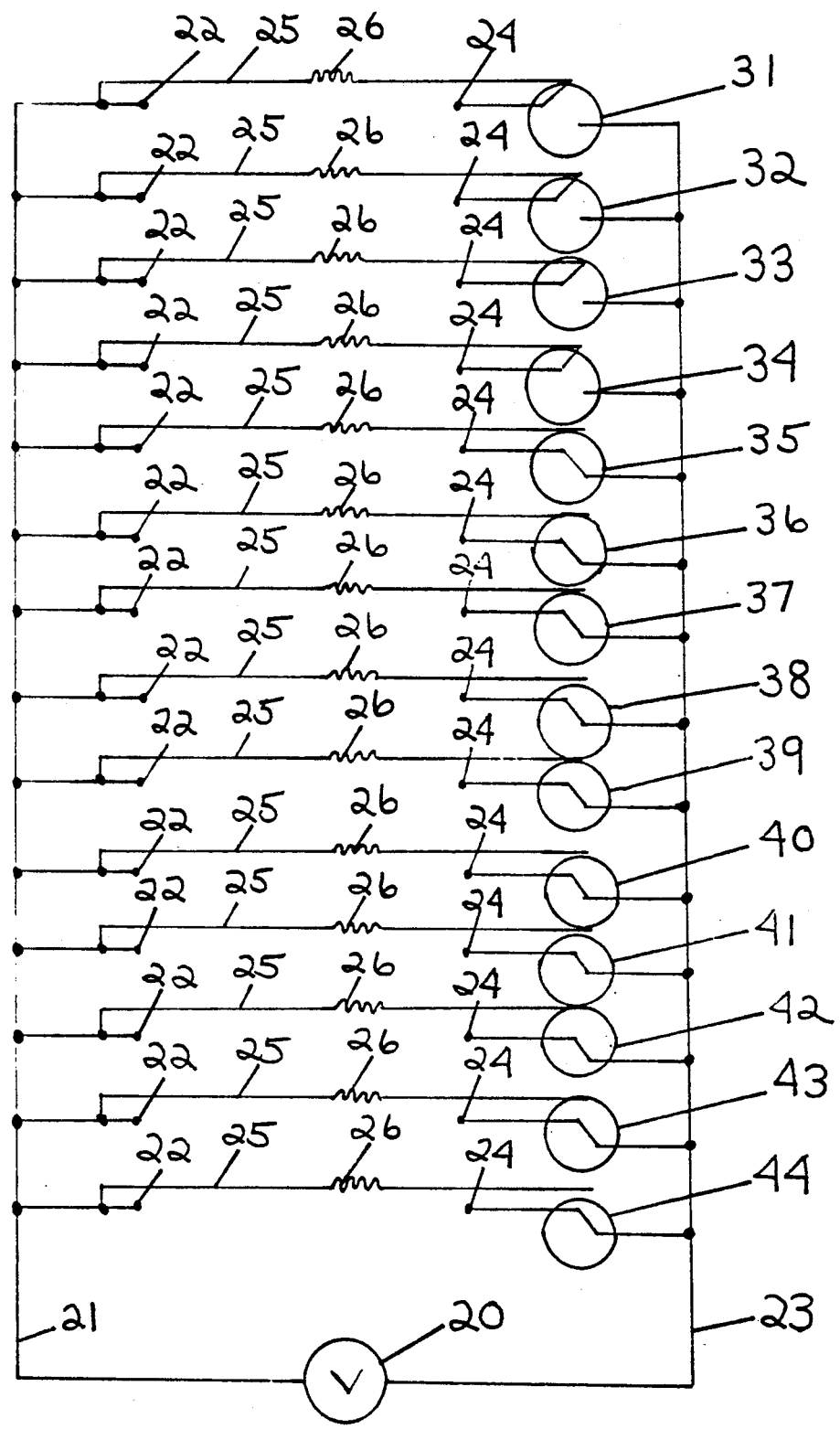
FIG. 2 shows a generalized schematic of the charging system.

Turning now to FIG. 2, the voltage source 20 supplies a voltage differential through a negative power line 21 to negative contacts 22, and through a positive power line 23 to positive contacts 24. Discharging lines 25, containing resistors 26 to prevent the batteries 7 from being discharged at a damaging rate, further couple the negative contacts 22 with the positive contacts 24. Switches 31-44 are positioned between the positive contacts 24, the positive power line 23, and the discharging lines 25, such that the switches 31-44 control whether the batteries 7 adjacent to the switches 31-44 will be discharged or charged. Depending on many factors, including how many batteries 7 are in the stack 8, and how soon those batteries 7 will be needed, the operator will set the switches 31-44 such that a certain number of batteries towards the top 9 of the stack 8 will be discharged, while the remaining batteries 7 towards the bottom 10 of the stack 8 will be charged.

In the preferred embodiment, each of the switches 31-44 are similar in appearance to a "wheel" volume control on a pocket radio, such that the operator can conveniently switch the switches 31-44 by running a finger along the right side 4 of the housing 1. Preferably, the switches 31-44 are marked by color or some other means such that the operator can readily determine whether each switch 31-44 is set for discharging or charging. In FIGS. 1 and 2, switches 31-34 are set for discharging, and switches 35-44 are set for charging.

One skilled in the art will recognize the possibility of a variation in which the discharging lines 25 could be shorted to each other, and the resistors 26 could be replaced by a single resistor 26. This variation is not presently preferred because there may be some advantage in having multiple resistors 26 having different resistances. In another exemplary variation, some or all of the switches are unnecessary. Switches 31-34 can be replaced with hardwired connections between the corresponding discharging lines 26 and positive contacts 24, while switches 35-44 can be replaced with hardwired connections between the corresponding positive contacts 24 and the positive power line 23. In still another exemplary variation, switches 31-40 may be left intact, while switches 42-44 are replaced with hardwired connections between the corresponding positive contacts 24 and the positive power line 23.

From the foregoing discussion, it should be apparent that the present invention resolves each of the problems described above. Stacking of the batteries 7 permits the housing to accommodate a large number of batteries 7, and this in turn reduces misplacement and fading of batteries 7 which would otherwise be left out of the charger. Those batteries 7 towards the bottom 8 of the stack 8, will receive the greatest voltage, while those batteries 7 towards the top 9 of the stack 8 will receive a least voltage. Finally, the provision for discharging the batteries 7 through the discharging lines 25 prevents the batteries from 7 suffering the effects of "memory."

Additional benefits of the present invention should now also be apparent to those skilled in the art. For example, the use of gravity as the sole means for advancing the batteries 7 towards the bottom 10 of the stack 8 completely eliminates the need for a mechanical advancing mechanism, and thereby results in a cheaper, more reliable charger. As another example, the stacking of the batteries 7 on top of each other is particularly well suited for long, thin batteries such as "AA" batteries. As yet another example, the parallel charging of the batteries 7 prevents a defective battery 7 from interfering with the charging of the other batteries 7.

What is claimed is:

1. A device for charging rechargeable batteries comprising:
   a housing sized and dimensioned to contain a stack of batteries, said stack having a top and a bottom;
   means for advancing the batteries from the top of the stack to the bottom of the stack;
   means for parallely charging at least one of the batteries in the stack; and
   means for causing at least one position to discharge and another position to charge the batteries such that the batteries are discharged and then subsequently charged as a result of passing from one of the positions to another in the housing.

2. The device of claim 1 wherein the means for advancing comprises the force of gravity.

3. The device of claim 1 wherein the means for charging comprises a power source supplying a voltage to at least one of the batteries in the stack, which voltage increases as the batteries advance towards the bottom of the stack.

4. The device of claim 3 wherein the voltage applied to the battery at the bottom of the stack is the minimum voltage that will maintain the battery in a fully charged state.

5. The device of claim 1 in which the means for discharging and recharging comprises a plurality of switches which determine the charging/discharging status of each position.

6. A method for charging rechargeable batteries comprising the following steps:
    stacking the batteries to form a battery stack having a plurality of positions which can be successively occupied by the batteries, including a bottom position;
    advancing the batteries towards the bottom position; and
    causing at least one of the positions within the stack to be a discharging position and at least one of the positions within the stack to be a charging position such that the degree of discharging or charging experienced by each battery as it advances towards the bottom of the stack is determined in part by the position occupied by the battery.

7. The method of claim 6 further comprising adding batteries to the top of the stack and removing batteries from the bottom of the stack.

8. The method of claim 6, wherein the step of stacking the batteries comprises aligning the batteries side by side.

9. The method of claim 6, wherein the step of advancing the batteries comprises allowing the batteries to move under the force of gravity.

10. An improved battery charger having a housing with a plurality of battery positions and a means for parallely charging batteries occupying at least one of the positions, the improvement comprising:
    means for automatically moving the batteries sequentially from one of the positions to another;
    means for causing at least one position to discharge and another position to charge the batteries such that the batteries are discharged and then subsequently charged as a result of passing from one of the positions to another in the housing.

* * * * *